United States Patent [19]

Steigerwald

[11] Patent Number: 4,845,605
[45] Date of Patent: Jul. 4, 1989

[54] HIGH-FREQUENCY DC-DC POWER CONVERTER WITH ZERO-VOLTAGE SWITCHING OF SINGLE PRIMARY-SIDE POWER DEVICE

[75] Inventor: Robert L. Steigerwald, Burnt Hills, N.Y.

[73] Assignee: General Electric Company, Schenectady, N.Y.

[21] Appl. No.: 211,804

[22] Filed: Jun. 27, 1988

[51] Int. Cl.[4] .......................................... H02M 3/335
[52] U.S. Cl. ........................................ 363/21; 363/97
[58] Field of Search ...................... 363/20, 21, 97, 126

[56] References Cited

U.S. PATENT DOCUMENTS

| | | | |
|---|---|---|---|
| 4,449,174 | 5/1984 | Ziesse | 363/21 |
| 4,605,999 | 8/1986 | Bowman et al. | 363/97 |
| 4,672,303 | 6/1987 | Newton | 323/222 |
| 4,685,041 | 8/1987 | Bowman et al. | 363/126 |
| 4,720,668 | 1/1988 | Lee et al. | 323/271 |

OTHER PUBLICATIONS

K-H Liu et al., "Zero-Voltage switching Technique in DC/DC Converters", IEEE 1986 PESC Record pp. 58-70 (Jun. 1986).
R. Redl et al., "Class-E Resonant Regulated DC/DC Power Converters: Analysis of Operation, and Experiment Results at 1.5 MHz.", IEEE 1983 PESC Record pp. 50-60 (Jun. 1983).
W. A. Tabisz et al., "Application of a Novel, Multi--Resonant Switch in High-Frequency DC/DC Converts", VPI Partnership Conference (1987).

Primary Examiner—William H. Beha Jr.
Attorney, Agent, or Firm—Geoffrey H. Krauss; James C. Davis Jr.; Marvin Snyder

[57] ABSTRACT

A high-frequency DC-DC Converter uses a single, primary-side power switching transistor and all of the circuit parasitic elements to achieve high efficiency and small size while operating from no-load to full-load with a relatively narrow operating frequency variation of only about 1.35:1 maximum, and with a reasonably low peak switching device voltage which is only about 3 times the input voltage. The energy stored in the switching device output capacitance is not lost during each high-frequency cycle, but is resonated back to the supply or load circuit. A single-ended-parallel, multi-resonant-converter (SEP-MRC) utilizes a control circuit for controlling the conduction, or "on", time of the single primary-side device, to adjust and regulate the load voltage.

12 Claims, 2 Drawing Sheets

HIGH-FREQUENCY DC-DC POWER CONVERTER WITH ZERO-VOLTAGE SWITCHING OF SINGLE PRIMARY-SIDE POWER DEVICE

The government has rights in this invention pursuant to Contract No. N66001-87-C-0378 awarded by the Department of the Navy.

BACKGROUND OF THE INVENTION

The present invention relates to DC-to-DC power converters and, more particularly, to novel high-frequency DC-DC power converters utilizing a single, primary-side power switching device, while employing all of the circuit parasitic elements, and achieving high efficiency and small size.

It is well known to provide power circuitry for converting an input DC potential to a different output DC potential by utilizing an oscillatory circuit operating at a relatively high frequency. It is highly desirable to utilize a high circuit-operating frequency to reduce reactive component sizes and therefore reduce the size of the overall power supply. It is therefore desirable to not only provide a high-frequency converter circuit topology, but to also provide such a converter circuit topology which: is relatively simple (i.e. has relatively few components, all of which are realizable with non-ideal, or "real", components); is easy to control (e.g. has all driver circuitry referenced to a ground, or common, potential); and places reasonably low electrical stress on the converter components. It is also desirable that any chosen power converter topology also be able to operate over a reasonable range of input voltages and output loads (i.e. operates continuously from a 0%, or no-load, condition to a 100%, or full-load, condition). All of these goals are to be met in a relatively simple circuit topology utilizing a single-ended (single primary-side power switching device) topology.

PRIOR ART

Prior art in the single-ended, high-frequency switching power converter field includes quasi-resonant switching, class-E switching and multi-resonant switching converters. Quasi-resonant converters, such as discussed by K. H. Liu, et al., in "Zero-Voltage Switching Technique in DC/DC Converters", IEEE 1986 PESC Record, pp 58–70 (June 1986), cannot operate from no-load to full-load and apply a very high voltage stress to the switching device (typically subjecting the switching device to a peak voltage which is 5× to 10× the input voltage, dependent upon the ranges of input and output load). Class-E switching converters, such as discussed by R. Redl et al., in "Class-E Resonant Regulated DC/DC Power Converters: Analysis of Operation, and Experimental Results at 1.5 MHz", IEEE 1983 PESC Record pp. 50–60 (June 1983), are narrow-band, tuned converters which require a relatively high Q-factor in the load circuit; the tuned circuit imposes a limitation on the converter's ability to support a wide range of load variation and may require an additional impedance-matching network, further complicating the circuit topology and operation, in order to cope with a relatively wide load variation range. Multi-resonant switching converters, such as described by A. T. Wojciech et al., in "Application of a Novel, Multi-Resonant Switch in High-Frequency DC/DC Converters", VPI Partnership Conference (1987), are converters with a modified quasi-resonant topology in which the capacitance of the output rectifier (considered a parasitic element in the quasi-resonant topology) is utilized in the resonant circuit for part of the cycle, so that, in practice, additional capacitance is added in parallel with the rectifier to achieve the total capacitance value required, and thus is a topology having two resonant capacitors (the switching device output capacitance and the diode capacitance) and suffering a major drawback, in all prior-art multi-resonant topologies for a lower output voltage, high-current power supply, requiring that a capacitor, capable of carrying very high current, is present in the output circuit; use of such a capacitor is not feasible in a high-efficiency supply.

BRIEF SUMMARY OF THE INVENITON

In accordance with the invention, a high-frequency DC-DC converter topology which uses a single, primary-side power switching transistor and all of the circuit parasitic elements to achieve high efficiency and small size, also operates from no-load to full-load with a relatively narrow operating frequency variation of only about 1.35:1 maximum, and has a reasonably low peak switching device voltage which is only about 3 times the input voltage. My novel singleended DC-DC power converter circuit has a predominant output ripple frequency component which is twice the switching frequency (compared to a predominant output ripple frequency component at the switching frequency for other singleended circuits), and requires a relatively small output filter. A small and efficient converter is realized by zero-voltage-switching (ZVS) operation, so that the energy stored in the switching device output capacitance is not lost during each high-frequency cycle, but is resonated back to the supply or load circuit.

In a presently preferred embodiment, a single-ended-parallel, multi-resonant-converter (SEP-MRC) utilizes a control circuit for controlling the conduction, or "on", time of the single-ended single primary-side device, to adjust and regulate the load, or output, voltage.

Accordingly, it is an object of the present invention to provide a novel single-ended DC-DC high-frequency power converter.

This and other objects of the present invention will become apparent upon reading the following detailed description, when considered in conjunction with the associated drawings.

DETAILED DESCRIPTION OF THE INVENTION

Figure 1:
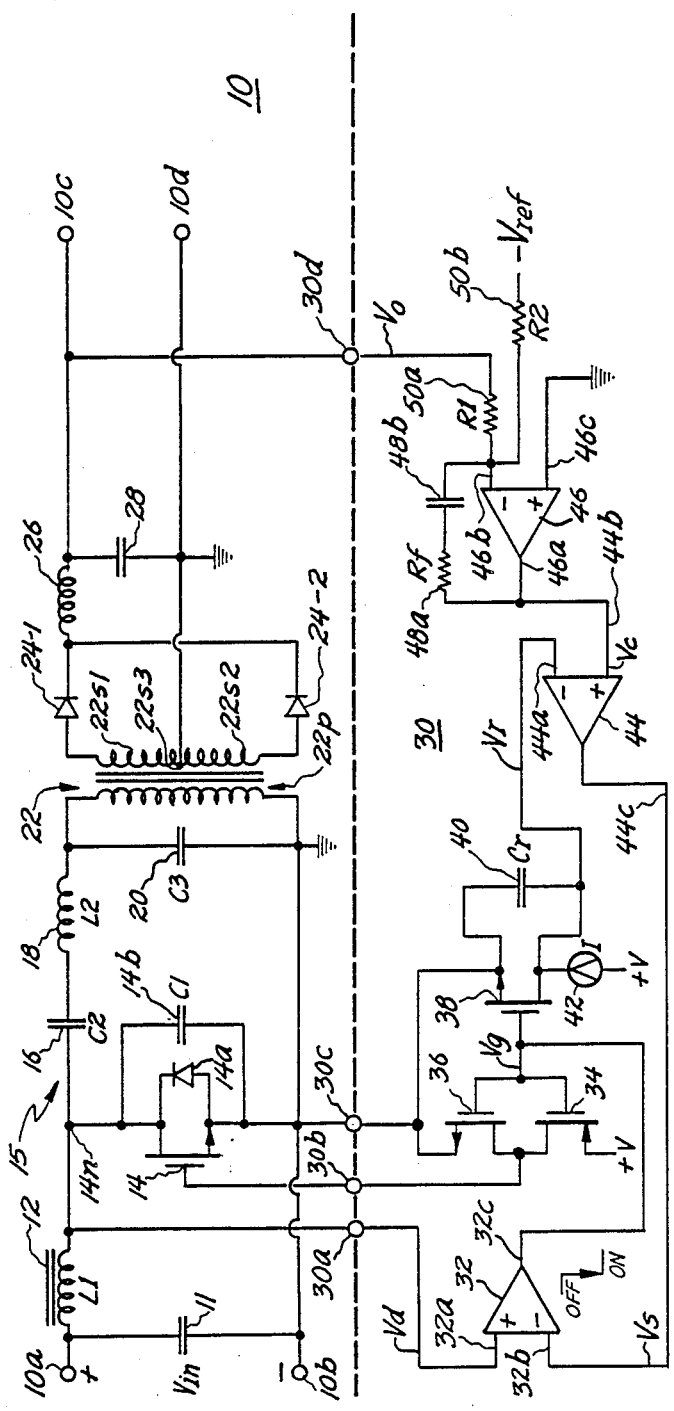
FIG. 1 is a schematic diagram of a presently preferred embodiment of my novel single-ended DC-DC highfrequency power converter.

Referring initially to FIG. 1, a presently preferred embodiment of my novel power converter 10 receives a DC input voltage $V_{in}$ between positive potential input terminal 10a and negative potential input terminal 10b, and across an input filtering capacitance 11. An input inductance 12, of magnitude L1, is connected between input terminal 10a and a node 14n defining that end of the controlled-conduction circuit of a single power switching device 14 opposite to a circuit common potential. Here, the single switching device 14 is a power MOSFET having a drain electrode connected to inductor 12 and a source electrode connected to circuit common terminal 10*b*. The controlled-conduction drain-source circuit (in which current flow is controlled responsive to the voltage at the device's gate electrode, with respect to its source electrode) is shunted by a parasitic reverse-polled diode 14*a* and a parasitic output capacitance 14*b*, of magnitude C1. It will be understood that a plurality of FETs of lower drain current rating can be appropriately connected in parallel to realize the equivalent of a single higher-current device. A multiresonant converter circuit 15 include a DC-blocking capacitor 16, of value C2, in series with an inductance 18, of value L2, in series with another capacitor 20, of value C3, all in parallel with the controlled-conduction circuit of the single power switching device 14. An output load transformer 22 has a primary winding 22*p* connected across capacitor 20. Transformer 22 includes a pair of secondary windings 22*s*1 and 22*s*2, connected at a center tap 22*s*3 therebetween, and with the remaining end of each secondary winding connected to the anode of an associated one of rectifier diodes 24-1 or 24-2. The parallel-connected cathodes of the full-wave-rectifying diodes 24 connect to an output filter inductance 26 and thence to one side of an output filter capacitance 28, connected in parallel from the positive output potential terminal 10*c*, with respect to an output common potential terminal 10*d*, which is itself connected to the remaining terminal of output capacitor 28 and the transformer secondary center tap 22*s*3. Terminals 10*b* and 10*d* can both be connected to a common power converter ground.

The switching device switched voltage $V_d$ is provided at a first input terminal 30*a* of a control circuit 30, which provides a high-frequency periodic driving signal via a drive terminal 30*b*, to the gate electrode of the switching device 14; all of the control circuit 30 input and output signals are provided with reference to the common potential at common terminal 30*c*. The converter DC output voltage $V_O$ is provided at a control circuit terminal 30*d*. Control circuit 30 includes a first comparator 32, having a non-inverting input 32*a* receiving the device drain-source voltage $V_d$ and an inverting input 32*b* receiving a switching signal $V_s$. A gating signal $V_g$ is provided at a first comparator output 32*c*, to the parallel-connected gate electrodes of first, second and third switching devices 34, 36 and 38, respectively. The first switching device 34 is a p-channel FET device having its source electrode receiving a positive operating voltage +V (provided by means not shown but well known to the semiconductor arts) and its drain electrode connected to the power device drive terminal 30*b*. Second switching device 36 is an n-channel FET having a drain electrode connected to drive terminal 30*b* and a source electrode connected to common terminal 30*c*. The third switching device 38 is also a n-channel FET, having a source electrode connected to common terminal 30*c* and a drain electrode connected to one terminal of a ramp-forming capacitor 40, of capacitance value $C_r$. The remaining terminal of ramp capacitor 40 is connected to common terminal 30*c*. The junction between the third switching device drain electrode and the ramp capacitor 40 receives a substantially constant current I from a current source 42, connected to the positive operating potential +V. The ramp voltage signal $V_r$, formed across capacitance 40 when third switching device 38 is in the cut-off condition, appears at an inverting input 44*a* of a second comparator 44. A noninverting input 44*b* of the second comparator receives a control voltage $V_c$, and serves to establish the binary logic state of the signal at a second comparator output 44*c*, which provides the $V_s$ signal to first comparator input 32*b*. The control voltage $V_c$ is provided at an output 46*a* of an operational error amplifier 46. An inverting input 46*b* of the operational amplifier is connected, through a feedback resistance 48*a* (of magnitude $R_f$) and an integrating capacitor 48*b*, to the error amplifier output 46*a*. A noninverting input 46*c* of the error amplifier is connected the circuit-common potential. The circuit output potential $V_o$ is connected through a first input resistance 50*a*, of value R1, to the error amplifier inverting input 46*b*, which is also connected through a second resistance element 50*b*, of value R2, to a negative reference potential ($-V_{ref}$).

The Single-Ended Parallel, Multi-Resonant-Converter (SEP-MRC) topology of power converter 10 overcomes the disadvantages of prior art single-ended topology. The SEP-MRC apellation has been selected for this power converter due to the fact that the power converter load circuit is the parallel resonant circuit 15, comprised of capacitor 20 in parallel with the load reflected back to the transformer primary winding 22*p*. It will be seen that all of the resonant components (parasitic capacitance 14*b*, series inductance 18 and parallel capacitance 20) are all on the high-voltage, primary side of the converter. Dependent upon the input and output voltages and output load, the single switching device 14 is gated on and off with a duty cycle between about 30 percent and about 70 percent. Capacitor 16 is a DC-blocking capacitor which serves to block the average voltage at the single power device drain electrode, to substantially prevent DC current from appearing in the transformer primary winding 22*p*. Thus, inductance L2 resonates with capacitance C3, and also with capacitance C1 (when single power device 14 is turned off and ceases to conduct) to produce an AC voltage across the transformer primary winding 22*p*. The resulting voltage across the transformer secondary windings 22*s* is full-wave rectified and filtered using an inductive input filter, chosen to avoid high-magnitude ripple currents in the low-voltage, secondary side of the converter. The ripple frequency on the secondary side is substantially double the frequency at which the primary side single power device 14 is switched, although a switching frequency component of very reduced amplitude is often present. I have found that the capacitance C3 of the parallel capacitor 20 should be about twice the capacitance C1 associated with the power FET 14. It will be seen that the interwinding capacitance of transformer 22 is essentially in parallel with, and is therefore part of, resonant capacitor 20, so that the transformer parasitic capacitance is used as a portion of the circuit in my novel power converter. It will also be seen that the rectifier capacitance, referred to the primary side of the transformer, is also directly in parallel with the resonant capacitor 20 and therefore does not present any particular problem. I have found that the maximum drain-source voltage for device 14 need only be about 3 times the input supply voltage $V_{in}$, so that a converter operating with a 100 VDC input potential need only have a FET maximum $V_{ds}$ rating of about 300 volts.

Figure 2A:
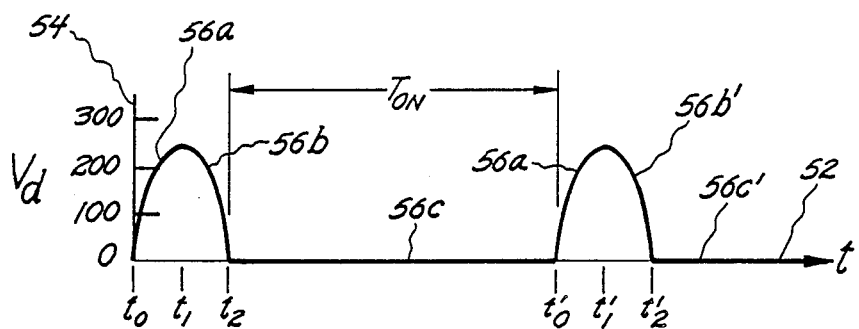
FIGS. 2a and 2b are time-coordinated graphs of signal voltages found in the circuit of FIG. 1, and useful for appreciating principles of operation thereof.
Figure 2B:
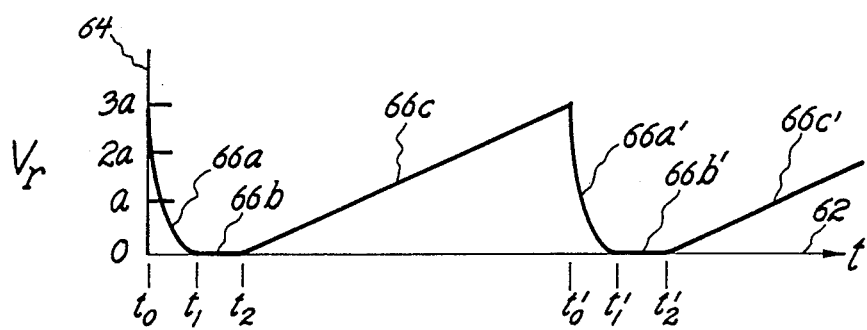

Referring now to FIGS. 1, 2*a* and 2*b*, during operation of power converter 10, the power FET 14 drain voltage $V_d$ (FIG. 2*a*) is initially low when device 14 is turned on and in saturation, immediately prior to time $t_o$, along time-scaled abscissa 52; ordinate 54 is scaled in voltage. Thus, immediately prior to time $t_O$, the voltage at drive terminal 30b is high, with respect to common terminal 30c, due to the saturation of device 34, caused by the low "on" level at first comparator output 32c; third switching device 38 is in the cut-off condition and an increasing voltage ramp $V_r$ signal appears across capacitor 40. The output voltage $V_O$ at terminal 30d is compared against the amplitude of the reference voltage and any error is amplified by amplifier 46 to change the level of the on-command voltage $V_c$. Comparator 44 compares the "on" command signal $V_c$ amplitude against the changing ramp voltage and changes the time at which the switching voltage $V_s$ is changed dependent upon the error between $|V_o|$ and $|V_{ref}|$. Thus, an increase in output voltage $V_o$ causes a decrease in command voltage $V_c$, which causes the second comparator output switching control voltage $V_s$ to fall after completion of a shorter time interval from commencement of the voltage $V_r$ ramp. The falling switching control voltage $V_s$ returns the first comparator output 32c to a high, or "off", level, and not only causes third switching device 38 to switch into saturation to reset the ramp generator, but also switches first switching device 34 into the cut-off condition and second switching device 36 into saturation to turn off device 14.

Device 14 is turned off at time $t_O$ and the drain voltage $V_d$ thereof begins to rise, as shown in portion 56a. The single power switching device drain voltage peaks at time $t_l$ and, due to the resonant action of resonance circuit 15, thereafter decreases, in portion 56b, to reach a minimum at time $t_2$, when the device is again turned "on". The "on" time interval $T_{on}$ portion 56c thus commences at time $t_2$, when the power device 14 is controlled to saturation by the gating voltage $V_g$ falling to its low level, responsive to the zero-voltage-switching action of first comparator 32, which allows the second comparator output switching signal $V_s$ to turn on the power device only if the resonant drain waveform $V_d$ has fallen to a substantially zero potential level.

Ramp voltage $V_r$ is shown in FIG. 2b, wherein time is plotted along abscissa 62 for increasing ramp voltage along ordinate 64. The ramp voltage initially decreases, in portion 66a, and remains substantially at zero, in portion 66b, while a non-zero drain voltage $V_d$ is present when device 14 is turned off (from time $t_o$ to time $t_2$). At time $t_2$, when the "on" time interval commences, device 38 is turned off and current source 42 begins charging capacitor 40, allowing the ramp voltage to increase in a substantially linear manner, as seen in portion 66c. When the ramp voltage $V_r$ increases to the level of the command voltage $V_c$ at second comparator terminal 44b, the output of first comparator 32 is inverted, if the drain-source voltage Vd of switching device 14 is low, indicative of device 14 being in the saturated condition. The "on" time interval $T_{on}$ thus ends, at time $t_0'$. The cycle repeats, with device 14 being turned off, so that the drain voltage $V_d$ can increase in portion 56a', while the ramp voltage 66a' decreasing portion occurs, and with the resonant circuit action then decreasing the switching device drain voltage, in portion 56b', while the ramp voltage remains substantially at zero in portion 56b', until time $t_2'$, when the switching device 14 is turned on, in saturated portion 56c' and the ramp voltage again begins to linearly increase in portion 66c', to result in another comparison with the command voltage $V_c$ now present. This new command voltage $V_c$ is the result of a new comparison between output voltage $V_o$ and the reference voltage, and acts in negative feedback manner to control the "on", or conduction, time of the device, so as to regulate the amplitude of the output voltage $V_O$.

For a given load resistance $R_L$, a quality factor $Q_o$ ($=R_L \sqrt{(L2/C3)}$) can be calculated and will result in a frequency ratio (F/F$_o$) which determines the actual frequency F to which switching must be adjusted to obtain the desired output voltage $V_o$, where the base frequency $F_o = \frac{1}{2}\pi\sqrt{(L2C3)}$. In one example of power converter 10, for an input voltage $V_{in}$ of 50 volts, the operatig frequency $F_m$ of the converter was about 810 KHz, with substantially zero percent load, and with about 133.5 $V_{pp}$ across parallel resonant capacitor 20. A 100% load frequency $F_m$ of about 600 KHz. resulted. The frequency range necessary for full control was therefore $F_m/F_m = 810/600 = 1.35:1$. When the input voltage to the converter was raised to 100 volts, the zero percent load frequency $F_m'$ about 850KHz. and the 100% load frequency $F_m'$ about 740 KHz.; the associated parallel resonant voltage $V_{c3}$ was about 288 $V_{pp}$. The frequency ratio was $F_M'/F_m' = 850/740 = 1.15:1$. It will be seen that the SEP/MRC power converter must operate over only about a 1.35:1 frequency range for a 50 volt to 100 volt $V_{in}$, no-load to full-load design.

Careful inspection of the waveforms applied to the transformer primary winding 22p revealed that the waveform thereacross is not perfectly symmetrical. There was, accordingly, a small component of the rectifier output voltage which was at the primary-side FET switching frequency (whereas for an ideal full-wave rectifier, the lowest frequency component is twice the FET switching frequency). This component was relatively small and did not require any substantial increase in the size or values of the output filter inductance or capacitance 28. Also, there was a small DC current component flowing in the transformer primary winding 22p. This DC current may manifest itself as slightly unequal conduction times of the secondary side rectifiers 24, although each of these rectifiers will carry the same peak DC current. The slightly unequal rectifier conduction was typically about 10% of the load current. To insure that the transformer 22 does not saturate, a lower mu core material can be used. My calculations indicate that if the core is biased to about 1000 Gauss with the DC current, using 180 Gauss peak AC flux as determined from allowable core loss, a relative mu of 47 is needed, which would result in a magnetizing inductance of about 166 microhenries. It will be seen that this DC current has a negligible effect on the size of transformer 22 and that, while one should be aware of the possibility of a DC primary winding current, it does not cause a problem.

There has been described a novel topology for a single-ended, high-frequency power converter which provides a relatively low voltage stress of the power device in a single-ended design and which utilizes transformer, rectifier and switching device capacitances as part of the various resonant capacitances of the circuit, to allow a high-frequency and high-density power converter to be realized. While one presently preferred embodiment of my novel power converter has been described herein, many variations and modifications will now become apparent to those skilled in the art. It is my intent, therefore, to be limited only by the scope of the appending claims and not by the specific details and instrumentalities presented herein about the single preferred embodiment.

What I claim is:

1. A power supply for providing a DC output potential of selected amplitude responsive to a DC input potential, comprising:

single-ended means for switching a node between respective high and low current-conduction conditions, with respect to a circuit common potential, responsive to a periodic control signal; said means having a parasitic reactance between said node and said common potential;

a multi-resonant circuit having at least one reactive element in series with said parasitic reactance during at least a portion of the control signal cycle;

a transformer having a primary winding, coupled in parallel across a portion of the multi-resonant circuit and receiving an AC potential formed by action of the single-ended means and said milti-resonant circuit, and a secondary winding across which is formed another AC potential related to said AC potential at said primary winding;

means for rectifying the another AC potential to provide said DC out-put potential; and means for providing the periodic control signal to said single-ended means with a varying frequency to maintain a selected amplitude of the DC output potential, and comprising: means for generating an error signal related to the difference between the actual amplitude of the DC output potential and a reference amplitude; means for generating a ramp signal commencing responsive to a gating signal; means for generating a switching signal to cause said single-ended means to switch conduction conditions and said ramp means to receive said gating signal, whenever the ramp and error signal amplitudes are substantially equal; and means for generating the gating signal only if the switching signal is present when the node is in the high-conduction condition to common potential.

2. The power supply of claim 1, wherein said single-ended means comprises a power semiconductor device.

3. The power supply of claim 2, wherein said power semiconductor device is a MOSFET.

4. The power supply of claim 2, wherein said single-ended means further comprises: input means receiving the DC input potential; and an inductive element in series connection between said input means and said node.

5. The power supply of claim 4, wherein the maximum peak potential between said nodes and the circuit common potential does not exceed three times the amplitude of the DC input potential.

6. The power supply of claim 1, wherein the multi-resonant circuit comprises a resonance inductive element and a fixed capacitance in series connection from said node to common potential.

7. The power supply of claim 6, wherein said fixed capacitance is connected in parallel with said primary winding.

8. The power supply of claim 7, wherein said multi-resonant circuit further includes a DC current-blocking capacitor connected in series with said primary winding.

9. The power supply of claim 6, wherein the base frequency $F_o$ of the multi-resonant circuit is less than the actual frequency of said periodic control signal.

10. The power supply of claim 9, wherein, for operation from no-load to full-load on the output potential, the variation in actual frequency is about 1.35:1.

11. The power supply of claim 1, wherein the control-signal-providing means varies the frequency by varying a time interval during which the high current-conduction exists.

12. The power supply of claim 11, wherein, during each frequency cycle, the low current conduction time interval duration remains substantially constant.

* * * * *